May 20, 1958  W. L. WILLIS  2,834,981
FISH HOLDING DEVICE
Filed Aug. 17, 1956

INVENTOR.
WALTER L. WILLIS
BY
ATTORNEY.

United States Patent Office 2,834,981
Patented May 20, 1958

2,834,981

FISH HOLDING DEVICE

Walter L. Willis, Detroit, Mich.

Application August 17, 1956, Serial No. 604,659

3 Claims. (Cl. 17—8)

This invention relates to a device for holding fish to facilitate the handling thereof while scaling, skinning or otherwise cleaning the same.

One of the objects of the invention is to provide a device of this character which is capable of holding fish of various sizes and shapes and to maintain the fish substantially rigid and stable throughout its length.

Another object of the invention is to provide a device of this type which is of simple construction, easy to manipulate, and which may be readily and economically manufactured and assembled.

Figure 1:
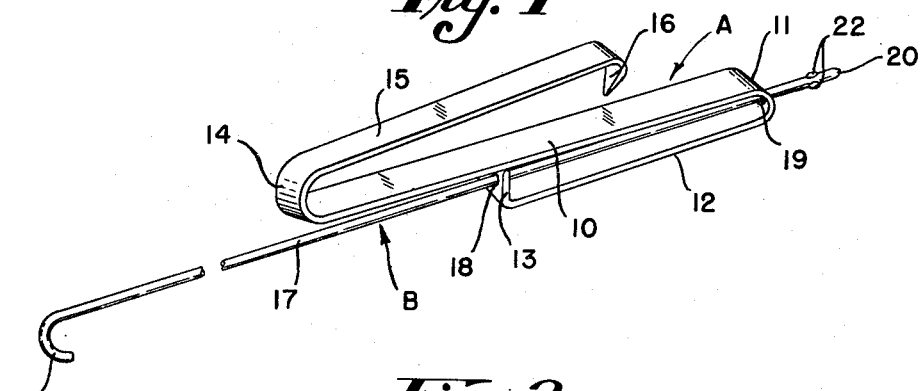
Figure 2:
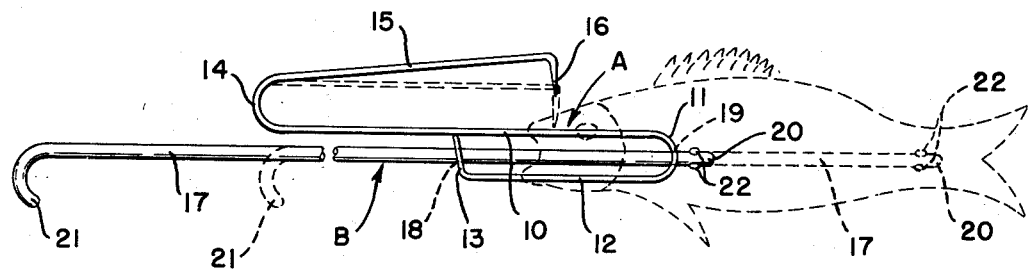
Figure 3:
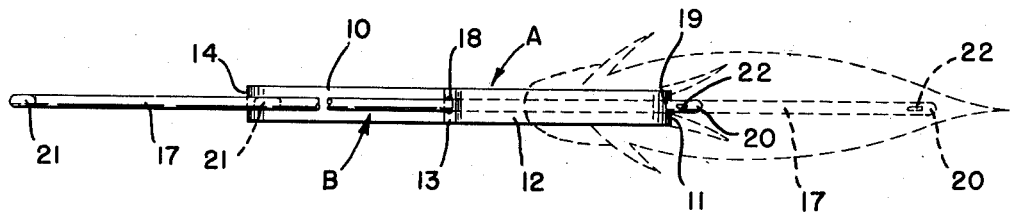

The various objects, advantages and novel details of construction of the device will become more apparent as this description proceeds, especially when considered in connection with the accompanying drawing, in which:

Figure 1 is a perspective view of a fish holding device constructed in accordance with the present invention, Figure 2 is a side elevation of the device, indicating in dotted lines its manner of use, and Figure 3 is a bottom plan view of the device, also indicating in dotted lines its manner of use.

Referring to the drawing, it will be noted that the device consists of but two unitary or integral parts indicated by the reference characters A and B. The part A constitutes the handle and fishhead gripping part of the device, and B, which is relatively movable thereto, constitutes the part adapted to maintain the fish in a substantially rigid and stable position.

The body portion, or member A of the device, may conveniently be formed from a strip of flexible resilient material, preferably spring metal. The strip of metal is bent and shaped to form a main or elongated body portion 10, having a reverse bend as at 11 to form a spaced parallel portion 12, which terminates in a right angular flange 13, which abuts the main body portion 10. The return-bent portion 11 is adapted to be inserted into the mouth of the fish.

The other end of the body portion 10 terminates in a reverse bend as at 14 to provide a resilient clamping arm or member 15, which terminates in a right angularly-extending pointed portion constituting an impaling prong 16. This impaling prong lies in opposed relation and adjacent to the portion adapted to be inserted into the mouth of the fish.

The part B consists of a stem or rod-like member 17 slidably mounted for movement relative to the member A in apertures 18 and 19 formed respectively in the flange 13 and return bend 11. One end of the rod or stem 17 is preferably pointed or sharpened as at 20, whereas the other end is bent to form a hook-like handle 21. The pointed end of the rod 17 may conveniently be provided with one or more projections 22 to prevent the complete withdrawal of the rod 17 through the aperture 19.

In using the device, the return-bend portion 11 of the member A is inserted into the mouth of the fish and the resilient arm 15 is forced from the full line position shown in Fig. 2, to the dotted line position to engage the prong 16 with the outside of the head of the fish. Thus, the head of the fish is gripped between the body portion 10 and the prong 16. The rod 17 is then thrust through the fish's mouth into its gullet or body cavity. Thus, the rod 17 is moved from the full line position to the dotted line position shown in Fig. 2. This provides inner support for the fish, and renders the same substantially rigid and stable throughout its length.

The device is grasped by the operator with one hand extending around the resilient arm 15, and main body portion 10 and the rod 17. This will hold the head of the fish gripped between the prong 16 and the body portion 10, and as stated, the rod 17, which extends substantially throughout the length of the fish, will hold the body of the fish rigid. Thus, the operator's other hand is free to scale, skin or otherwise clean the fish.

As will be apparent, the device is simple to manufacture, and easy to operate, and provides an efficient means for handling any shape or size fish during the cleaning operation.

Having thus described the invention what is claimed is:

1. A device for introduction into the mouth and body cavity of a fish whereby to maintain the carcass substantially stable for cleaning, comprising a strip of resilient material having a straight intermediate portion terminating at its ends in reverse bends which dispose the respective end portions of the strip adjacent said straight intermediate portion, one of such bend-connected end portions being arranged to engage and clamp the head of a fish against the intermediate strip portion when the other bend and the strip portions contiguous thereto have been introduced into the mouth of the fish; and a rod member slidably carried by the strip adjacent its said intermediate portion and movable forwardly thereof to project beyond the mouth-inserted portions and extend into the body cavity of the fish.

2. A device for introduction into the mouth and body cavity of a fish whereby to maintain the carcass substantially stable for cleaning, comprising a body member consisting of a strip of metal having an intermediate straight portion terminating at its ends in reverse bends which dispose the respective end portions of the strip at opposite sides of and adjacent to said intermediate portion, one of said strip end portions extending substantially parallel to the intermediate portion and in conjunction therewith providing a mouth-engaging section, and the other of the strip end portions providing a resilient clamping member arranged to engage and clamp the head of a fish against the intermediate strip portion when said mouth-engaging section has been introduced into the fish mouth; and a rod member longitudinally slidably mounted on the body member and movable forwardly beyond the mouth-engaging section thereof to extend into the body cavity of the fish.

3. A fish holding device as recited in claim 2, wherein the strip end portion that extends parallel to the intermediate portion is provided with an angularly extending flange which abuts said intermediate portion, and the rod member is mounted in apertures provided respectively in such flange and the reverse bend connecting said parallel strip end portion to the intermediate portion.

References Cited in the file of this patent

UNITED STATES PATENTS

| 1,083,493 | Irwin | Jan. 6, 1914 |
| 2,603,829 | Siskoff | July 22, 1952 |

FOREIGN PATENTS

| 278,529 | Germany | Sept. 30, 1914 |
| 45,794 | Sweden | Sept. 20, 1919 |